United States Patent [19]
Auld

[11] Patent Number: 5,835,636
[45] Date of Patent: Nov. 10, 1998

[54] METHOD AND APPARATUS FOR REDUCING THE MEMORY REQUIRED FOR DECODING BIDIRECTIONALLY PREDICTIVE-CODED FRAMES DURING PULL-DOWN

[75] Inventor: David R. Auld, San Jose, Calif.

[73] Assignee: LSI Logic Corporation, Milpitas, Calif.

[21] Appl. No.: 653,845

[22] Filed: May 28, 1996

[51] Int. Cl.[6] .............................. G06K 9/36; G06K 9/46
[52] U.S. Cl. .......................................... 382/233; 348/714
[58] Field of Search ..................................... 382/232, 233, 382/236; 348/446, 714, 715, 716, 718, 719; 395/507, 509, 512, 521, 432, 433

[56] References Cited

U.S. PATENT DOCUMENTS 5,646,693   7/1997   Cismas ..................................... 348/402

*Primary Examiner*—Phuoc Tran
*Attorney, Agent, or Firm*—Conley, Rose & Tayon, PC; B. Noel Kivlin

[57] ABSTRACT

A video decoder system for reconstructing, storing and retrieving bidirectionally predictive-coded (B) frames for display including pull-down conversion includes a reconstruction unit for reconstructing the frames, where the reconstruction unit reconstructs the top-upper field of every other frame twice. The frame is conceptually divided into four sections, including top-upper, top-lower, bottom-upper and bottom-lower sections. A memory having only three segments for storing pixel data is provided, where each segment is sized to store any one of the frame sections. A segmentor receives and separates the pixel data according to the top and bottom fields for each section of each frame, and stores pixel data from the top field into one segment pixel data from the bottom field into another segment. The segrnentor initially selects any two segments for the upper half of the first frame, and then selects a segment being retrieved for display and the third segment for the bottom half of the first frame. Thereafter, the segmentor selects the segment currently being retrieved for display and whichever segment contains pixel data that has already been retrieved and that will not be re-displayed. The segmentor also selects one segment for receiving the upper portion of the top field being reconstructed again for pull-down, which is that segment currently being retrieved for display. The decoder system also includes retrieval circuitry for retrieving pixel data from one of said three segments at a time for interlaced display.

14 Claims, 7 Drawing Sheets

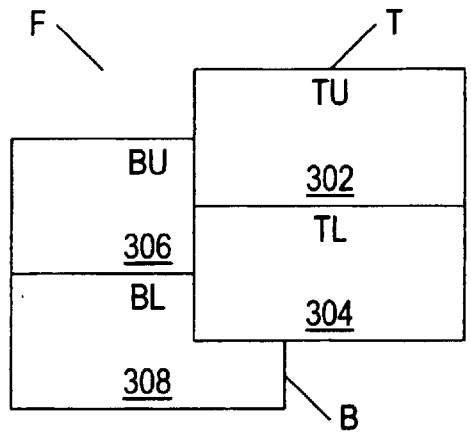
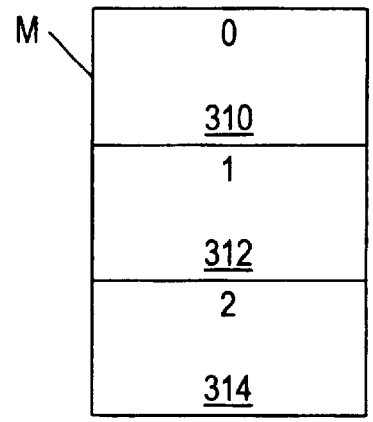
FIG. 3A  FIG. 3B
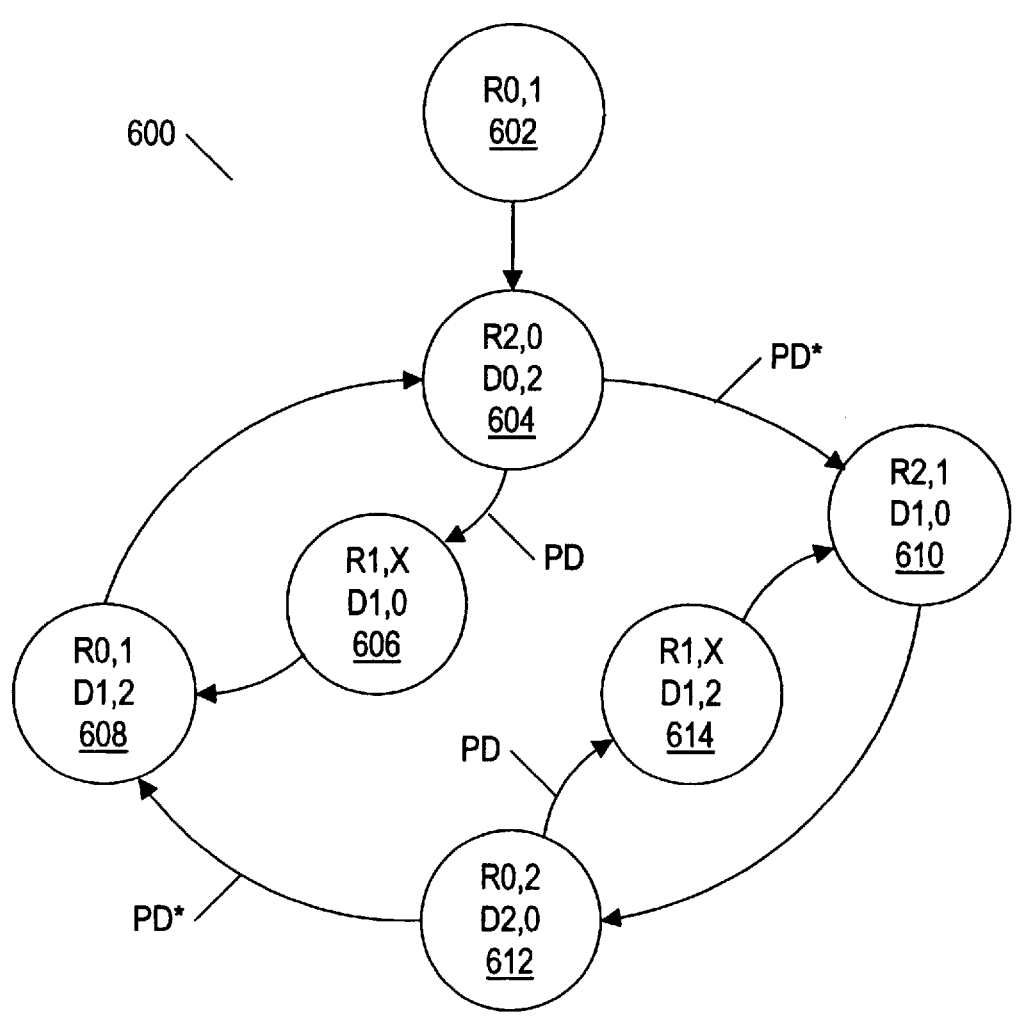
FIG. 6

METHOD AND APPARATUS FOR REDUCING THE MEMORY REQUIRED FOR DECODING BIDIRECTIONALLY PREDICTIVE-CODED FRAMES DURING PULL-DOWN

FIELD OF THE INVENTION

The present invention relates to video systems, and more particularly to memory segmentation and field reconstruction repeat for reducing the amount of memory required in a video decoder for decoding and displaying bidirectionally predictive-coded frames with pull-down.

DESCRIPTION OF THE RELATED ART

A video program signal is converted to a digital format, and then compressed and encoded in accordance with one of several known compression algorithms or methodologies. This compressed digital system signal, or bitstream, which includes a video portion, an audio portion, and other informational portion, is then transmitted to a receiver. Transmission may be over existing television channels, cable television channels, satellite communications channels, and the like. A decoder is then typically employed at the receiver to decompress and decode the received system signal in accordance with the same compression algorithm used to encode the signal. The decoded video information may then be output to a display device, such as a television (TV) monitor.

Video compression and encoding is typically performed by a video encoder. The video encoder normally implements a selected data compression algorithm that conforms to a recognized standard or specification agreed to among the senders and receivers of digital video signals. One such emerging standard developed by the Moving Pictures Experts Group (MPEG), is generally referred to as the MPEG-1 Standard. A newer standard, referred to as MPEG-2, is similar to MPEG-1 but includes extensions to cover a wider range of applications. More particularly, MPEG-2 concerns high-quality coding of possibly interlaced video, including high definition television (HDTV). A wide range of applications, bit rates, resolutions, signal qualities and services are addressed, including all forms of digital storage media, TV broadcasting and communications.

In order to compress a video signal, it is typically necessary to sample the analog data and represent this data with digital values of luminance and color difference. The MPEG standard specifies that a luminance component (Y) of a video signal may be sampled with respect to a color difference signals (Cr, Cb) by a ratio of two-to-one (2:1). That is, for every two samples of the luminance component Y, there is one sub-sample each of the color difference components Cr and Cb. A 2:1 sampling ratio is generally considered acceptable because the human eye is much more sensitive to luminance (brightness) components than to color components. Video sampling typically is performed in both the vertical and horizontal directions.

Once the video signal is sampled, it is typically formatted into a non-interlaced signal that contains all of the picture content. More particularly, the video signal includes a plurality of pictures or frames, where each frame includes a plurality of horizontal scan lines for display. An interlaced signal, in contrast, is one that contains only part of the picture content for each complete display scan. In an interlaced signal, each frame is divided into two fields. The two fields are often referred to as the even and odd or the top and bottom fields. Each field spans the length of the frame, but only includes every other scan line. The purpose for such field division is that most TVs today display the video information in interlaced format, by displaying one field first, such as the entire top field, then displaying the entire bottom field.

After a video signal is sampled and formatted, the encoder may process it further by converting it to a different resolution in accordance with the image area to be displayed. In doing so, the encoder must determine how to encode each picture. A picture may be considered as corresponding to a single frame of motion video, or to a frame of movie film. However, different encoding schemes may be employed for each picture. The most prevalent picture coding types are: I-pictures (intra-coded pictures) which are coded without reference to any other pictures and are often referred to as anchor frames; P-pictures (predictive-coded pictures) which are coded using motion-compensated prediction from the past I- or P-reference picture, and may also be considered anchor frames; and B-pictures (bidirectionally predictive-coded pictures) which are coded using motion compensation from a previous and a future I- or P-picture. These picture types will be referred to as I, P or B frames.

A typical coding scheme may employ a mixture of I, P, and B frames. Typically, an I frame may occur every half a second, with two B frames inserted between each pair of I or P frames. I frames provide random access points within the coded sequence of pictures where decoding can begin, but are coded with only a moderate degree of compression. P frames are coded more efficiently using motion compensated prediction from a past I or P frame and are generally used as a reference for further prediction. B frames provide the highest degree of compression but require both past and future reference pictures for motion compensation. B frames are generally not used as references for prediction. The organization of the three picture types in a particular video sequence is very flexible. A fourth picture type is defined by the MPEG standard as a D-picture, or DC-picture, which is provided to allow a simple, but limited quality, Fast-Forward mode.

Once the picture types have been defined, the encoder may estimate motion vectors for each 16 by 16 macroblock in a picture. A macroblock (MB) is the basic coding unit for the MPEG standard. A macroblock consists of a 16-pixel by 16-line portion, or four 8-pixel by 8-line blocks, of luminance components (Y) and several spatially corresponding 8 by 8 blocks of chrominance components Cr and Cb. The number of blocks of chrominance values depends upon which particular format is used. Common color space sampling schemes include 4:4:4 for maximum quality but relatively low compression, 4:2:2 including two Cb chrominance blocks and Cr chrominance blocks, and 4:2:0 including two chrominance blocks. A plurality of such macroblocks form a horizontal slice within a frame, where the slice is the basic processing unit in an MPEG coding scheme. A plurality of such slices form each picture or frame, which is the basic unit of display. As described previously, however, each frame is typically interlaced and displayed as two separate fields.

Motion vectors provide displacement information between a current picture and a previously stored picture. P frames use motion compensation to exploit temporal redundancy, or lack or motion, between picture frames in the video. Apparent motion between sequential pictures is caused by pixels in a previous picture occupying different positions with respect to the pixels in a current macroblock. This displacement between pixels in a previous and a current macroblock is represented by motion vectors encoded in the MPEG bitstream. Typically, the encoder chooses which picture type is to be used for each given frame. Having defined the picture type, the encoder then estimates motion vectors for each macroblock in the picture. Typically in P frames, one vector is employed for each macroblock, and in B frames, one or two vectors are used.

When the encoder processes B frames, it usually re-orders the picture sequence so that a video decoder receiving the digital video signal operates properly. Since B frames are usually coded using motion compensation based on previously sent I or P frames, the B frames can only be decoded after the subsequent anchor pictures (an I or P frame) have been received and decoded. Thus, the sequence of the series of pictures may be re-ordered by the encoder so that the pictures arrive at the decoder in a proper sequence for decoding of the video signal. The decoder may then re-order the pictures in proper sequence for viewing.

For a given macroblock of video data, the encoder is programmed to select a coding mode depending on the picture type, the effectiveness of motion compensation in the particular region of the picture, and the nature of the signal within the block. After the coding method is selected, the encoder performs a motion-compensated prediction of the block contents based on past and/or future reference pictures. The encoder then produces an error signal by subtracting the prediction from the actual data in the current macroblock. The error signal is similarly separated into 8 by 8 blocks (four luminance blocks and two chrominance blocks). A Discrete Cosine Transform (DCT) may then be performed on each block to achieve further compression. The DCT operation converts an 8 by 8 block of pixel values to an 8 by 8 matrix of horizontal and vertical coefficients of spatial frequency. Coefficients representing one or more non-zero horizontal or non-zero vertical spatial frequencies are called AC coefficients. An 8 by 8 block of pixel values can subsequently be reconstructed by a video decoder performing an Inverse DCT (IDCT) on the spatial frequency coefficients.

Additional compression is provided through predictive coding since the difference in the average value of neighboring 8 by 8 blocks tends to be relatively small. Predictive coding is a technique employed to improve compression based on the blocks of pixel information previously operated on by an encoder. A prediction of the pixel values for a block yet to be encoded may be performed by the encoder. The difference between the predicted and actual pixel values may then be computed and encoded. The different values represent prediction errors which may later be used by a video decoder to correct the information of a predicted block of pixel values.

In addition to the signal compression that is achieved by the encoding process itself, a substantial degree of intentional signal compression is achieved by a process of selecting a quantization step size, where the quantization intervals or steps are identified by an index. The quantization level of frequency coefficients corresponding to the higher spatial frequencies favors the creation of coefficient values of zero by choosing an appropriate quantization step size based on the human visual perception system. In particular, the step size is chosen sot that the human visual perception system is unlikely to notice the loss of a particular spatial frequency unless the coefficient value for that spatial frequency rises above the particular quantization level. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering. The coefficient sequence is often organized in a specified orientation termed zigzag ordering. Zigzag ordering concentrates the highest spatial frequencies at the end of the series. Once the zigzag ordering has been performed, the encoder typically performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, run-length coding results in additional video compression.

The encoder may then include a variable length decoder (VCD) to perform variable-length coding (VLC) on the resulting data. VLC is a reversible procedure for coding data that assigns shorter code words to frequent events and longer code words to less frequent events, thereby achieving additional video compression. Huffinan encoding is a particularly well-known form of VLC that reduces the number of bits necessary to represent a data set without losing any information. The final compressed video data is then ready to be transmitted to a storage device or over a transmission medium for reception and decompression by a remotely located decoder. The MPEG standard specifies a particular syntax for a compressed bitstream. The MPEG video syntax comprises six layers, each of which supports either a signal processing flnction or a system function. The MPEG syntax layers correspond to a hierarchical structure. A "sequence" is the top layer of the video coding hierarchy and consists of a header and some number of "Groups-of frames" (GOPs). The sequence header generally initializes the state of the decoder, which allows the decoder to decode any sequence without being affected by past decoding history. A GOP is a random access point, that is, it is the smallest coding unit that can be independently decoded within a sequence. A GOP typically consists of a header and some number of "pictures." The GOP header contains time and editing information.

As discussed previously, there are at least three types of pictures or frames: I frames, P frames and B frames. Because of the picture dependencies, the order in which the frames are transmitted, stored, or retrieved, is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependent B frame.

Each of the "picture" portions of a GOP consists of a header and one or more slices. The picture header contains time stamp, picture type, and coding information. A slice consists of an integral number of macroblocks from a picture and can be used by a video decoder to recover from decoding errors. If the bitstream becomes unreadable within a picture, the decoder will normally be able to recover by waiting for the next slice, without having to drop the entire picture. A slice also includes a header that contains position and quantizer scale information. Since blocks are the basic coding unit, the DCT is applied at the block level. Each block typically contains 64 component pixels arranged in an 8 by 8 matrix. The pixel values are not individually coded, but are components of the coded block. A macroblock header is included which contains quantizer scale and motion compensation information.

The video decoding process is generally the inverse of the video encoding process and is employed to reconstruct a motion picture sequence from a compressed and encoded bitstream. The data in the bitstream is decoded according to a syntax that is itself defined by the data compression algorithm. The decoder must first identify the beginning of a coded picture, identify the type of picture, then decode each individual macroblock within a particular picture. If there are motion vectors and macroblock types (each of the frame types I, P, and B have their own macroblock types) present in the bitstream, they can be used to construct a prediction of the current macroblock based on past and future reference frames that the decoder has already stored. Coefficient data is then inverse quantized and operated on by an IDCT process so as to transform the macroblock data from the frequency domain to data in the time and space domain.

After all of the macroblocks have been processed by the decoder, the picture reconstruction is complete. If a reconstructed frame is a reference or anchor frame, such as an I or a P frame, it replaces the oldest stored anchor frame and is used as the new anchor for subsequent frames. As noted above, the frames may also need to be re-ordered before they are displayed in accordance with their display order instead of their coding order. After the frames are re-ordered, they may then be displayed on an appropriate display device.

In general, encoded video data is received and stored in a rate or channel buffer. The data is then retrieved from the channel buffer by a decoder or reconstruction device for performing the decoding process and the decoded data is stored into a picture store buffer. In some configurations, the channel and picture buffers are incorporated into a single integrated memory device. The decoded data is in the form of I, P or B frames, where a display controller retrieves the picture data for display by an appropriate display device, such as a TV monitor or the like. It is noted that prior to a system according to the present invention, the picture buffer had to be capable of storing at least three frames or "framestores" of video information. Two frames of storage was necessary for storing two anchor frames. The two anchor frames were then used to reconstruct a B frame into the third frame storage area.

In particular, to reconstruct a B frame, its two related anchor frames must be decoded and available in the picture buffer. This is true since the B frame is interpolated using both anchor frames during the reconstruction process. Because macroblocks include information for both even and odd fields for each frame, reconstruction of each B frame is performed progressively, or in a non-interlaced order. However, display of each frame is in an interlaced order, where an entire top field is displayed first before beginning the bottom field. Thus, B frame reconstruction must lead the display of the B frame by at least half a frame, and the reconstruction process had to be completed to finish the display of the entire B frame. Due to the progressive versus interlaced order between reconstruction and display, an entire frame had to be available in prior art systems to complete reconstruction of each B frame for display. Thus, prior art systems had to include at least three frame stores of memory.

The present disclosure primarily concerns MPEG-2 decoders compliant with the International Standards Organization/International Electro-technical Commission (ISO/IEC) 2-13818 standard for supporting NTSC (National Television Systems Committee) or PAL (Phase Alternating Line) standards. The NTSC resolution is 720×480 picture elements (pixels) and the PAL resolution is 720×576 pixels per frame. The picture rate is 24 to 30 frames per second. At a sampling rate of 4:2:0, each frame requires an average of 12 bits per pixel. For memory devices such as a dynamic random access memory (DRAM), each PAL type frame requires 4,976,640 bits of storage and each NTSC frame requires 4,147,200 bits of storage. The NTSC standard is primarily for use in the United States (U.S.), whereas the PAL standard is primarily for use in Europe. Since a minimum of three frames of storage were required, a PAL system would require at least 3×4,976,640=14,929,920 bits (14.9 Mb) of memory. An NTSC system would require at least 3×4,147,200=12,441,600 bits (12.5 Mb) of memory. Furthermore, additional memory was required for the channel buffer, as well as overhead storage area for performing a variety of miscellaneous overhead functions, where such overhead memory was either distributed in the decoder system or incorporated into the integrated memory.

A further complication is introduced if a decoder is required to include 3:2 pull-down capability, which is currently required for NTSC decoders. The NTSC format specifies a frame rate of 30 frames per second, whereas the frame rate for a movie is 24 frames per second. Thus, ratio of frame rates between the NTSC format and a movie is 5 to 4 frames. Although it would be possible to convert the frame rates at the encoder, this is undesirable since this would result in substantially less compression of video data being transmitted or stored. Thus, it is desired to convert the frame rate at the decoder when receiving a bitstream of encoded video data. In order to convert a movie for display for NTSC, one of every four fields of the movie is repeated to convert to the NTSC format. In the MPEG-2 video coding standard for NTSC, for example, it is necessary to display data stored in the top field of a frame more than once if the bitstream signals repeat top field. Since a frame includes two fields, one of the fields of every other frame is repeated, resulting in a pattern of 3 fields, 2 fields, 3 fields, 2 fields, etc., hence the name "3:2 pull-down." To achieve 3:2 pull-down, a field of every other frame had to remain in memory long enough to be displayed a second time before being overwritten. Up till now, a single framestore for B frames has still been sufficient to include 3:2 pull-down capability. However, a decoder with a single framestore further required that the decoding or reconstruction process be stalled one field time for every other frame to prevent overwriting the repeated field.

The amount of memory is a major cost item in the production of such decoders. Thus, it is desired to reduce the memory requirements of the decoder system as much as possible to reduce its size and cost. Since practical memory devices are implemented using particular convenient discrete sizes, it is important to stay within a particular size if possible for commercial reasons. For example, it is desired to keep the memory requirements below a particular size of memory, such as 16 Mb, since otherwise a memory device of 24 or 32 Mb would have to be used resulting in greater cost and a waste of extraneous storage area. Although it is possible to implement an NTSC decoder including three full frames of storage within a 16 Mb DRAM memory device, it is still desirable to reduce the memory requirements for NTSC decoders.

SUMMARY OF THE INVENTION

A decoder system according to the present invention overcomes these limitations and allows reduction of memory for decoding and displaying B frames during 3:2 pull-down. In general, B frames are not used to predict other frames, so that once the B frame data is retrieved for display, it may be discarded. To enable re-use of memory, data from the top and bottom fields is separated into different segments of memory. Thus, once retrieval begins of the data in a segment, that segment becomes free for reconstruction. However, this initial scheme is not completely sufficient for the top field of every other frame during 3:2 pull-down, since the top field must be somehow made available again for re-display. Rather than requiring additional memory to save the top field of every other frame, the top field is reconstructed again during the period when reconstruction is typically stalled. In this manner, the amount of memory required is reduced, and the field requiring re-display for 3:2 pull-down is simply reconstructed again. It is noted that the term "display" refers to retrieving data for eventual display, since the data might also be retrieved for transmittal, encoding, storage, etc., and not necessarily for immediate display.

In the preferred embodiment, a frame is conceptually divided into four different sections, including the top-upper, the top-lower, the bottom-upper and the bottom-lower fields. The memory includes only three segments, where each segment is the same size as each of the sections. Thus, each segment of memory is sufficient for storing any one of the four different sections of the frame. The portion of the memory used for B frames is three-fourths the size of a full framestore. During the reconstruction process, the pixel data is separated between top and bottom fields and stored in a respective one of two available segments of memory. In particular, the data from each macroblock is separated into two respective fields and stored in a corresponding segment of the memory, so that each consecutive line in each segment corresponds to consecutive lines of one field. During retrieval, the data within each segment of memory is retrieved line by line for display until the entire segment is retrieved. The entire memory segment is available for reconstruction as soon as retrieval of that segment is initiated. Since each segment includes a plurality of scan lines stored consecutively and retrieved consecutively, the DRAMs typically used to implement the memory are addressed in a standard manner. Therefore, segmentation of the memory allows the DRAM page hit rate to be maintained at the same level, so that storage and retrieval of data from the memory is not slowed. Furthermore, such segmentation of the memory keeps the data organized and prevents undesirable fragmentation of the memory.

For each frame, reconstruction of the upper half of the frame involves the top-upper and bottom-upper sections. Thus, the top-upper section is stored in one segment and the bottom-upper section is stored in another segment. After half the frame is reconstructed in this manner, retrieval of the top field of that frame begins. The segment storing the top-upper section is retrieved first according to interlaced display. Almost immediately after retrieval of a segment begins, that segment may be used for reconstruction of another section of the frame. This is true since retrieval of a segment occurs faster than its reconstruction. Thus, the third segment and the segment being retrieved for display are used to store the top-lower and bottom-lower sections during reconstruction of the lower half of the frame. Approximately half way through reconstruction of the lower half of the frame, retrieval of the segment holding the top-upper section is completed and retrieval for display of the segment containing the top-lower section begins, even though its reconstruction is not yet completed. Nonetheless, reconstruction of each pixel in the segment is completed before its retrieval for display.

At this point, two segments contain the data for the bottom-upper and bottom-lower sections of the frame, so that retrieval for display of the bottom field begins. One segment still contains the data for the top-lower section of the frame, so that re-display of this section is possible for 3:2 pull-down. However, the segment originally containing the top-upper section has been overwritten and used for the bottom field. Thus, the segment storing the bottom-upper section is used to reconstruct the top-upper section while being retrieved, so that reconstruction is not stalled. Although reconstruction is typically performed with two segments, the data for the bottom-upper section is discarded while reconstructing the top-upper field again. In this manner, reconstruction of the top-upper section of the frame is reconstructed during retrieval of the bottom field for display. Then, after the bottom field is retrieved for display, the two segments of memory containing the top field are retrieved to re-display the top field. Reconstruction of the second frame begins during retrieval of the top field of the first frame for re-display. Operation is similar for the second frame, except that the top field is not reconstructed twice since it is not re-displayed for the second frame.

Since only three segments are necessary for a frame typically requiring four segments of memory, the portion of the memory for B frames is three-fourths or 0.75 the size of a full framestore. An NTSC frame including 720 pixels×480 lines using 4:2:0 sampling, where each pixel includes, on the average, 12 bits, has a full framestore of 4,147,200 bits. The B frame is thus reduced to 3,110,400 bits, where each of the segments of memory is preferably 1,036,800 bits. The present invention, therefore, allows reduction of the picture buffer memory for NTSC to 11,404,800 bits or approximately 11.4 Mb. Of course, these specific sizes of memory correspond to the NTSC format. The present invention is not limited to any particular video format or framestore size and may be used to reduce the memory requirements of any video system using 3:2 pull-down capability. Furthermore, the present invention is applicable for different types of video systems using pull-down schemes with different ratios. Such variations are simply a matter of design choice.

More particularly, a decoder system according to the present invention for reconstructing, storing and retrieving B frames for display including pull-down conversion includes a reconstruction unit for reconstructing the B frames, where the reconstruction unit reconstructs the top-upper field of every other frame twice. The decoder system includes a memory having only three segments for storing pixel data, where each segment is sized to store any one of the frame sections. A segmentor is included for receiving and separating the pixel data according to the top and bottom fields for each section of each frame, where the segmentor stores pixel data from the top field into one segment and stores pixel data from the bottom field into another segment of the memory. The segmentor initially selects any two segments for the upper half of the first frame, and then selects a segment being retrieved for display and the remaining segment for the bottom half of the first frame. Thereafter, the segmentor selects the segment currently being retrieved for display and whichever segment contains pixel data that has already been retrieved and that will not be re-displayed. The segmentor also selects one segment for receiving the upper portion of the top field being reconstructed again for pull-down. The selected segment for pull-down is that segment being retrieved for display. The decoder system also includes retrieval circuitry for retrieving pixel data from one of said three segments at a time for interlaced display.

A method of reconstructing, storing and retrieving pixel data for display of B frames using pull-down conversion according to the present invention uses three segments of memory, where each segment is one-fourth the size of a framestore. The method comprises the steps of reconstructing the upper half of each frame into pixel data, reconstructing the lower half of each frame into pixel data, and for every other frame, reconstructing the upper half of the frame into pixel data again. During each of the reconstruction steps, the method also includes the steps of separating the pixel data according to top and bottom fields of the frame, selecting two available segments for reconstructing the upper half of the frame, selecting another two available segments for reconstructing the lower half of the frame and further selecting one available segment for reconstructing the upper half again. The method further includes the steps of storing top field pixel data into one selected segment and storing bottom field data into the other selected segment while reconstructing the upper half of the frame and while reconstructing the lower half of the frame, and further storing top field pixel data into the selected segment for reconstructing the upper half of the frame again. Finally, the stored pixel data from the segments of memory is retrieved for interlaced display.

The step of selecting segments in the above method may further include the steps of selecting any two segments for the top half of the first frame, selecting a segment being retrieved and the third segment for the bottom half of the first frame, and during either of reconstructing steps, selecting the segment being retrieved for display and whichever segment contains pixel data that has already been retrieved and that will not be retrieved for re-display, and while reconstructing the upper half of the frame again, selecting the segment being retrieved for receiving top field pixel data. The above method may further include steps of updating a segment table including a list of pointers to segments according to interlaced display, and retrieving pointers from the segment table.

BRIEF DESCRIPTION OF THE DRAWINGS

A better understanding of the present invention can be obtained when the following detailed description of the preferred embodiment is considered in conjunction with the following drawings, in which:

FIG. 3A is a diagram is shown of a frame conceptually divided according to the present invention;

FIG. 3B is a diagram illustrating a memory used for reconstructing and displaying B frames including 3:2 pull-down;

FIG. 6 is a state diagram illustrating operation according to the present invention;

DETAILED DESCRIPTION OF THE PREFERRED EMBODIMENT

Figure 1:
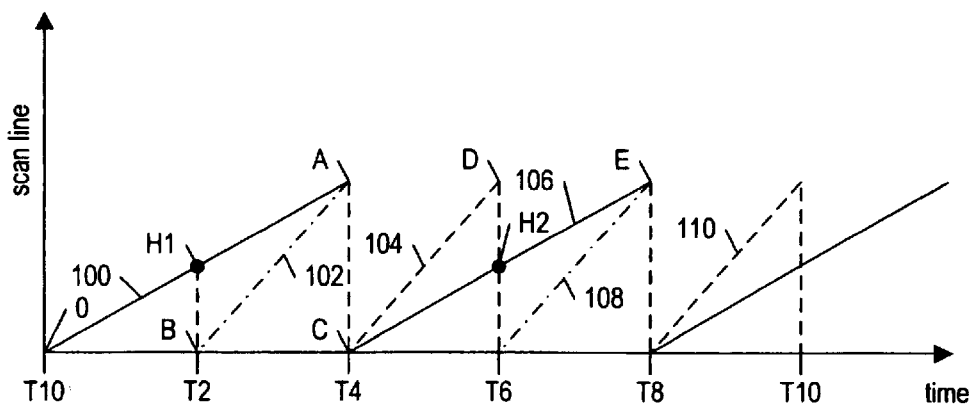
FIG. 1 is a graph illustrating operation of a decoder system according to prior art.

FIG. 1 is a graph illustrating operation of a decoder system operating according to prior art without performing 3:2 pull-down. Each of the scan lines forming a B frame are referenced along the y-axis and time is plotted along the x-axis of the graph. Between times T0 and T4, a first B frame, referred to as FR0, is reconstructed as illustrated with a solid line 100 plotted between the origin (O) and a point A of the graph. Such reconstruction occurs in a progressive manner, where each macroblock for each slice is reconstructed one at a time into a picture buffer (not shown). Each macroblock includes data for a contiguous 16-pixel by 16-line portion of the frame. Thus, each macroblock incorporates data for both fields, where the consecutive lines of data are stored at consecutive locations within the picture buffer. For both NTSC and PAL type decoders, 45 such macroblocks are reconstructed for each slice having a width of 720 pixels. For NTSC systems including 480 total scan lines, 30 slices are reconstructed for each frame for a total of 1,350 macroblocks per frame. For PAL systems including 576 total scan lines, 36 slices are reconstructed for each frame for a total of 1,620 macroblocks per frame. It is noted that PAL systems display 25 frames per second whereas NTSC systems display 30 frames per second, so that each system reconstructs and displays about 40,500 macroblocks per second on the average.

At time T2, after reconstruction of approximately half of the first frame FR0 is completed as indicated by a point H1, a display device (not shown) begins retrieving and displaying the first or top field of the first frame FR0, referred to as FR0-FD0. A dash-dot line 102 plotted between points B and A illustrates display of the top field FR0-FD0 of the first frame FR0, where such display completes at approximately time T4. On the average, reconstruction and display of each pixel occurs at roughly the same rate. However, reconstruction of each frame occurs progressively, line by line, whereas display occurs in an interlaced manner, or every other line corresponding to a field. Thus, the effective rate of display of each slice of scan lines is twice as fast as reconstruction for each macroblock row of pixel data. Since the display of the top field FR0-FD0 of the frame FR0 takes half the time as reconstruction of the entire frame FR0, the slope of the line 100 is about half that of the slope of line 102. However, only half of the frame FR0 has been displayed at time T4. Furthermore, it is noted that reconstruction of the last several lines of the last slice of the frame FR0 corresponding to the field FR0-FD0 is completed just prior to those same lines being displayed. In this manner, reconstruction and display are substantially locked together.

Beginning approximately at time T4, the display device begins retrieving and displaying the second or bottom field of the first frame FR0, referred to as field FR0-FD1. This is illustrated with a dashed line 104 plotted between points C and D, where display of the bottom field FR0-FD1 of the first frame FR0 is completed at approximately time T6. Also between times T4 and T8, reconstruction of a second frame FR1 occurs, as illustrated by a solid line 106 plotted between points C and E. Since a single framestore of memory is used, such reconstruction of the second frame FR1 overwrites the data for the first frame FR0. Thus, the displaying of the bottom field FR0-FD1 of the first frame FR0 must begin slightly before reconstruction begins of the second frame FR1, since otherwise the data for the bottom field FR0-FD1 would be overwritten by data for the second frame FR1. Such delay is relatively short, however, and could be the delay associated with a single macroblock of data. Since the display of the bottom field FR0-FD1 of the first frame FR0 occurs at twice the effective rate of reconstruction of the second frame FR1, such display and reconstruction proceeds concurrently between times T4 and T6 without interfering with each other.

At time T6, display of the bottom field FR0-FD1 of the first frame FR0 completes while reconstruction of the second FR1 is approximately half completed, as illustrated at point H2. Thus, at time T6, the entire first frame FR0 has been displayed, while half of the second frame FR1 has been reconstructed. Between times T6 and T8, display of the top field FR1-FD0 of the second frame FR1 is performed, as illustrated by a dash-dot line 108 between points F and E. Thus at time T8, reconstruction of the entire second frame FR1 and display of the top field FR1-FD0 of the second frame FR1 is completed. Display of the bottom field FR1-FD1 of the second frame FR1 begins at time T8 and ends at time T10, as illustrated by a dashed line 110. Reconstruction and display of a third and subsequent frames proceeds in a similar manner beginning at time T8.

Figure 2:
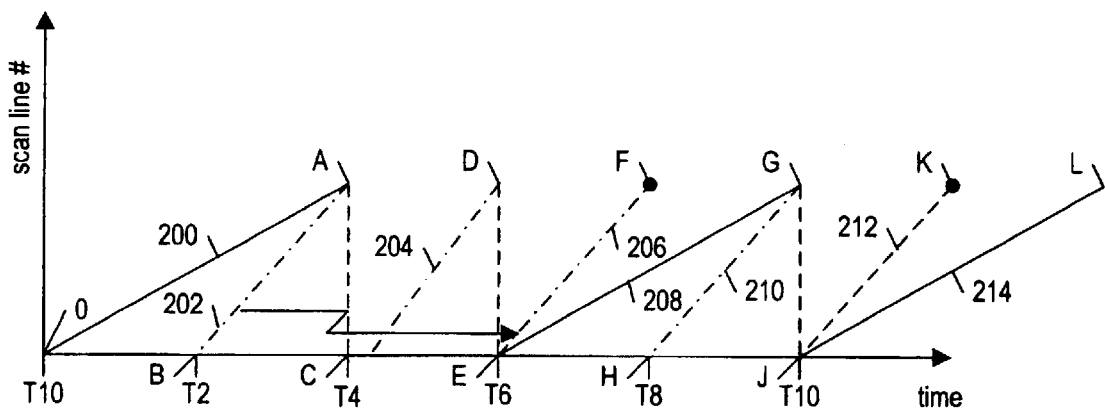
FIG. 2 is a graph illustrating operation of a decoder system operating according to prior art while performing 3:2 pull-down.

FIG. 2 is a graph illustrating operation of a decoder system operating according to prior art while performing 3:2 pull-down. Such a system requires at least three full framestores of memory. Again, each of the scan lines forming a B frame are referenced along the y-axis and time is plotted along the x-axis of the graph. Between times T0 and T4, the first B frame is reconstructed as illustrated with a solid line 200 plotted between the origin (O) and a point A of the graph. Again, such reconstruction occurs in a progressive manner. At time T2, after reconstruction of approximately half of the first frame is completed, the display device begins retrieving and displaying the top field of the first frame. A dash-dot line 202 plotted between points B and A illustrates display of the top field, where such display completes at approximately time T4.

Beginning approximately at time T4, the display device begins retrieving and displaying the bottom field of the first frame. This is illustrated with a dashed line 204 plotted between points C and D, where display of the bottom field occurs between times T4 and T6. In contrast to FIG. 1, reconstruction of the second frame does not begin at time T4, but instead is stalled until time T6. Reconstruction stall prevents overwrite of the top field of the first frame, which is displayed again between times T6 and T8 as illustrated with a dash-dot line 206 plotted between points E and F. Reconstruction of the next frame also begins at approximately time T6, as illustrated with a solid line 208 plotted between points E and G. It is noted that since reconstruction of the second frame is half the speed of re-display of the top field of the first frame, these two events effectively occur simultaneously without prematurely losing the data of the top field being re-displayed. At time T8, after the top field of frame 1 is redisplayed and halfway through reconstruction of the second frame, the display device begins displaying the top field of the second frame. This is illustrated with a dash-dot line 210 plotted between points H and G, where display of the top field of the second frame completes at time T10. Then, at time T10, display of the bottom field of the second frame and reconstruction of the third frame both begin. Display of the bottom field is illustrated with a dashed line 212 plotted between points J and K, and reconstruction of the third frame is illustrated with a solid line 214 plotted between points J and L. It is noted that re-display of the top field of the second frame is not necessary, so that reconstruction of the third frame is not stalled. Operation continues in this fashion where the top field of the third frame is re-displayed and reconstruction of the fourth frame is stalled, and so on.

A review of FIGS. 1 and 2 reveals that at least three framestores of memory is sufficient for reconstructing and displaying B frames both with and without 3:2 pull-down. It is conceivable that less memory could be used for B frames, since after data in a memory area is displayed, that memory area is available for reconstruction. For practical reasons, however, this has not been achieved in prior art systems. Reconstruction occurs progressively on macroblocks of data at a time, while display is interlaced and is performed in raster scan format. Thus, reconstruction of a subsequent frame in the same area of memory would destroy data in the bottom field of the present frame. This is particularly problematic for systems requiring 3:2 pull-down, since the top field data for every other frame must be stored for re-display.

It is conceivable to use less memory for B frames by reconstructing the data twice as fast, so that reconstruction is performed twice. However, although the reconstruction process may be sped up by a certain amount, practical decoding systems are not presently capable of reconstructing at twice the present rate. Furthermore, even if double-speed reconstruction were possible, it would be required to store the data at twice the present rate. Present DRAM devices and similar practical memory devices, however, are not capable of such storage speeds. Thus, reconstruction and display processes are effectively locked together, so that an entire framestore of memory was required for B frames. This was true for decoder systems with or without 3:2 pull-down capability.

A decoder system according to the present invention overcomes these limitations and allows reduction of memory for decoding and displaying B frames during 3:2 pull-down. In general, B frames are not used to predict other frames, so that once the B frame data is retrieved for display, it may be discarded. To enable re-use of memory, data from the top and bottom fields is separated into different segments of memory. Thus, once retrieval for display begins of the data in a segment, that segment becomes free for reconstruction. However, this initial scheme is not completely sufficient for the top field of every other frame during 3:2 pull-down, since the top field must be somehow made available again for re-display. Rather than requiring additional memory to save the top field of every other frame, the top field is reconstructed again during the period when reconstruction is typically stalled. In this manner, the amount of memory required is reduced, and the field requiring re-display for 3:2 pull-down is simply reconstructed again. It is noted that the present invention is not limited to immediately displaying the data, so that the term "display" refers to retrieving data for eventual display. For example, although the data from a segment may be displayed immediately upon retrieval, the data might also be retrieved for transmittal, encoding, storage, etc., and not necessarily for immediate display.

In the preferred embodiment, a frame is conceptually divided into four different sections, including the top-upper, the top-lower, the bottom-upper and the bottom-lower fields. The memory includes only three segments, where each segment is the same size as each of the sections. Thus, each segment of memory is sufficient for storing any one of the four different sections of the frame. Thus, the portion of the memory used for B frames is three-fourths the size of a full framestore. During the reconstruction process, the pixel data is separated between top and bottom fields and stored in a respective one of two available segments of memory. In particular, the data from each macroblock is separated into two respective fields and stored in a corresponding segment of the memory, so that each consecutive line in each segment corresponds to consecutive lines of one field. During the retrieval for display process, the data within each segment of memory is retrieved line by line for display until the entire segment is retrieved. The entire memory segment is available for reconstruction as soon as retrieval of that segment is initiated. Since each segment includes a plurality of scan lines stored consecutively and retrieved consecutively, the DRAMs typically used to implement the memory are addressed in a standard manner. Therefore, segmentation of the memory allows the DRAM page hit rate to be maintained at the same level, so that storage and retrieval of data from the memory is not slowed. Furthermore, such segmentation of the memory keeps the data organized and prevents undesirable fragmentation of the memory.

For each frame, reconstruction of the upper half of the frame involves the top-upper and bottom-upper sections. Thus, the top-upper section is stored in one segment and the bottom-upper section is stored in another segment. After half the frame is reconstructed in this manner, retrieval of the top field of that frame begins. The segment storing the top-upper section is retrieved first according to interlaced display. Almost immediately after retrieval of a segment begins, that segment may be used for reconstruction of another section of the frame. This is true since retrieval of a segment occurs faster than its reconstruction. Thus, the third segment and the segment being retrieved for display are used to store the top-lower and bottom-lower sections during reconstruction of the lower half of the frame. Approximately half way through reconstruction of the lower half of the frame, retrieval of the segment holding the top-upper section is completed and retrieval for display of the segment containing the top-lower section begins, even though its reconstruction is not yet completed. Nonetheless, reconstruction of each pixel in the segment is completed before its retrieval for display.

At this point, two segments contain the data for the bottom-upper and bottom-lower sections of the frame, so that retrieval for display of the bottom field begins. One segment still contains the data for the top-lower section of the frame, so that re-display of this section is possible for 3:2 pull-down. However, the segment originally containing the top-upper section has been overwritten and used for the bottom field. Thus, the segment storing the bottom-upper section is used to reconstruct the top-upper section while being retrieved, so that reconstruction is not stalled. Although reconstruction is typically performed with two segments, the data for the bottom-upper section is discarded while reconstructing the top-upper field again. In this manner, reconstruction of the top-upper section of the frame is reconstructed during retrieval of the bottom field for display. Then, after the bottom field is retrieved for display, the two segments of memory containing the top field are retrieved to re-display the top field. Reconstruction of the second frame begins during retrieval of the top field of the first frame for re-display. Operation is similar for the second frame, except that the top field is not reconstructed twice since it is not re-displayed for the second frame.

It is noted that the data required to reconstruct the top-upper field is already stored in a channel buffer of the decoder. The channel buffer is preferably implemented as a circular buffer and the decoder ensures that the data in the channel buffer necessary to reconstruct the top-upper field is not overwritten until it has been reconstructed the second time.

Since only three segments are necessary for a frame typically requiring four segments of memory, the portion of the memory for B frames is three-fourths or 0.75 the size of a full framestore. An NTSC frame including 720 pixels×480 lines using 4:2:0 sampling, where each pixel includes, on the average, 12 bits, has a full framestore of 4,147,200 bits. The B frame is thus reduced to 3,110,400 bits, where each of the segments of memory is preferably 1,036,800 bits. The present invention, therefore, allows reduction of the picture buffer memory for NTSC to 11,404,800 bits or approximately 11.4 Mb. Of course, these specific sizes of memory correspond to the NTSC format. The present invention is not limited to any particular video format or framestore size and may be used to reduce the memory requirements of any video system using 3:2 pull-down capability. Furthermore, the present invention is applicable for different types of video systems using pull-down schemes with different ratios. Such variations are simply a matter of design choice.

It is noted that a decoder system according to the present invention may be used to handle still frames. Since the reconstruction unit is also stalled during still frames, a processing element may be used to continually reconstruct the 'missing' segment on demand. Furthermore, a decoder system according to the present invention may be implemented in any type of application including video capability, where the present invention is not limited by the particular application. For example, the decoder system could be incorporated into digital video disk (DVD) applications, entertainment systems, communications systems, etc. The decoder system may be implemented in any one or more of a plurality of system types, such as a set top box, a personal computer (PC) or any larger computer system, such as workstations, servers, minicomputers, main frame computers, super computers, etc. The system may include single chip modules (SCM), multi-chip modules (MCM), board level products, box level products, etc.

A decoder system according to the present invention is preferably incorporated into an MPEG-2 type system. However, the present invention is also applicable to other decoder types, such as MPEG-1, Wavelet, H.261, H.320, JPEG, etc. The present invention is preferred for PAL type display formats, although other display formats are contemplated, such as NTSC, red, green, blue (RGB) formats, etc. The present invention may be used with any type of display device, such as a TV, monitor, liquid crystal display (LCD), plasma screen, visual projection device, virtual reality display, etc. The present invention includes a memory device, which is typically implemented using a dynamic random access memory (DRAM) for cost considerations. However, other memory types may be used, such as static RAM (SRAM), video RAM (VRAM), or other types of RAM systems with adequate performance.

Referring now to FIG. 3A, a diagram is shown of a B frame, referred to by the letter F, which is conceptually divided according to the present invention. Each frame F includes a top field T and a bottom field B, where the top field T is displayed first followed by the bottom field B for interlaced display. Each frame F is conceptually divided into four sections, including a top-upper section (TU) 302, a top-lower section (TL) 304, a bottom-upper section (BU) 306 and a bottom-lower section (BL) 308. Thus, the display order is TU, TL, BU and BL for each frame F for interlaced display. For 3:2 pull-down, the TU and TL sections are re-displayed in order following the BL section. FIG. 3B is a diagram illustrating a memory M used for decoding (reconstructing) and displaying B frames including 3:2 pull-down. Three segments of the memory M are defined, including a segment #0 310, a segment #1 312 and a segment #2 314. Each of the segments #0–#2 has sufficient capacity for storing any one of the sections TU, TL, BU and BL.

Figures 4, 5:
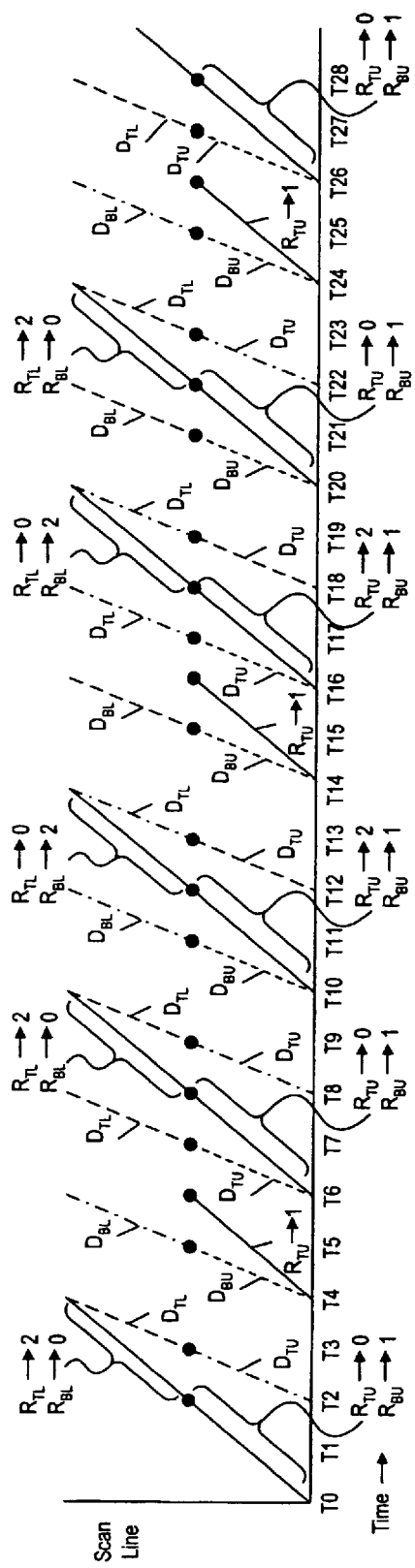
FIG. 4 is a graph is shown illustrating reconstruction and display operations of a decoder system according to the present invention.
FIG. 5 is a tabular diagram illustrating operation of a decoder system according to the present invention.

Referring now to FIG. 4, a graph is shown illustrating operation of a decoder system operating according to the present invention while performing 3:2 pull-down. In contrast to FIGS. 1 and 2, FIG. 4 is demonstrated with respect to segments of memory rather than fields or sections of a frame. The three segments #0–#2 of the memory M shown in FIG. 3B are used to display one or more B frames F shown in FIG. 3A. Segment #0 is illustrated with a dash-dot line, segment #1 is illustrated with a dotted line, and segment #2 is illustrated with a dashed line. Since reconstruction typically occurs into two segments at a time, solid lines are shown to illustrate reconstruction. Reconstruction of a section is denoted by the letter R, and display is denoted by the letter D. Thus, reconstruction of the TU section is denoted by RTU and display of that same section (or the corresponding segment of memory) is denoted $D_{TU}$. As described above, the data need not be immediately displayed, so that the term "display" refers to retrieval of data for display.

FIG. 5 is a tabular diagram 500 corresponding to the graph of FIG. 4 for illustrating operation of a decoder system according to the present invention. The tabular diagram 500 includes a plurality of columns generally aligned with the time increments of the graph of FIG. 4. Each column of the tabular diagram 500 represents access of the segments #0–#2 of the memory M during each time increment, and each row corresponds to one of the segments over time, as denoted to the left of the tabular diagram 500. For example, an entry of $R_{TU}$ for segment #0 between times T0 and T2 denotes that the TU section of the frame is being written into segment #0 during reconstruction. Also, an entry of $D_{TU}$ for segment #0 between times T2 and T3 indicates display of data in segment #0 corresponding to the section TU. FIGS. 4 and 5 should be referenced together for the following description of operation.

Beginning at time T0, reconstruction of a first frame begins, which ends at time T4. During the first half of reconstruction of the first frame between times T0 and T2, segment #0 stores data from the TU section, denoted $R_{TU}$, while segment #1 stores data from the BU section, denoted $R_{BU}$. It is noted that any two of the segments #0–#2 could be used to begin the reconstruction process, where segments #0 and #1 are chosen arbitrarily. Since half of the first frame is completely reconstructed at time T2, a display device (not shown) begins retrieving data from segment #0 at time T2 to display the top-upper section, denoted $D_{TU}$, where display of the top-upper section is completed at time T3. Between times T2 and T4, reconstruction of the lower half of the first frame begins, including the TL and BL sections. Since segment #0 starts being displayed at time T2, it is available for reconstruction just after time T2. Thus, the data for the TL section is written to section #2, denoted $R_{TL}$, while data from the BL section is written to section #0, denoted $R_{BL}$. Meanwhile at time T3, reconstruction of the TL section is at least halfway completed into segment #2. Thus, the TL section is displayed from segment #2, denoted $D_{TL}$, between times T3 and T4.

At time T4, reconstruction of the entire first frame, and display of the top field of the first frame, has been completed. Also, segment #1 contains data for the BU section and segment #0 contains data for the BL section of the first frame. Between times T4 and T5, therefore, display of the BU from segment #1 is performed and between times T5 and T6, display of the BL section from segment #0 occurs. The top field including sections TU, TL of the first frame is to be re-displayed for 3:2 pull-down. Segment #2 contains data for the TL section of the first frame. However, the data from the TU section no longer resides in segment #0 since it was overwritten with data from the section BL during times T2 to T4. Thus, during display of the BU section from segment #1 and display of the BL section from segment #0 between times T4 and T6, reconstruction of the TU section is again performed, where the data is stored into segment #1. Although reconstruction typically occurs using two segments of the memory M, only one segment is used and the data for the BU section is ignored or otherwise discarded.

At time T6, the TU section of the first frame resides in segment #1 and the TL section of the first frame resides in segment #2. Thus, the data of the TU section in segment #1 is re-displayed between times T6 and T7 and the data of the TL section in segment #2 is re-displayed between times T7 and T8 for pull-down of the top field of the first frame. At time T8, display of the first frame is completed, including re-display of the top field.

Meanwhile at time T6, reconstruction of the TU and BU sections of the second frame are reconstructed into segments #0 and #1, respectively. Between times T8 and T9, the TU section of the second frame stored in segment #0 is displayed and between times T9 and T10, the TL section of the second frame stored in segment #2 is displayed. Meanwhile, between times T8 and T10, the TL and BL sections of the second frame are reconstructed into segments #2 and #0, respectively. Another reconstruction of the TU section of the second frame is not necessary since the top field of the second frame is not repeated. Thus, the BU section of the second frame is displayed from segment #1 between times T10 and T11, while the BU section of the third frame is reconstructed into that same segment #1 between times T10 and T12. The TU section of the third frame is reconstructed into segment #2 while the BL section of the second frame is displayed from segment #0 between times T 11 to T12. At time T12, the second frame has been completely displayed and the upper half of the third frame has been reconstructed. Operation continues in a similar manner for the third frame as for the first frame, where the TU section of the third frame is reconstructed again into segment #1 between times T15 and T16. The entire procedure begins repeating at about frame 5.

Referring now to FIG. 6, a state diagram 600 is shown illustrating operation of the present invention. The state diagram 600 illustrates operation of a finite state machine (FSM) used to control a decoder system for performing 3:2 pull-down, such as an NTSC decoder system. The FSM may be implemented in hardware, software, or any combination thereof. Seven states 602, 604, 606, 608, 610, 612 and 614 are defined, each corresponding to one field time of a frame. The state diagram 600 also corresponds to FIGS. 4 and 5, where each state corresponds to two of the time intervals (Tn). For example, state 602 corresponds to the time interval T0–T2, state 604 corresponds to the time interval T2–T4, state 606 corresponds to the time interval T4–T6, etc. The state diagram 600 may be used to build the tabular diagram 500 of FIG. 5 and the graph shown in FIG. 4. In each state, an "R" denotes reconstruction, which is followed by two segment numbers into which data is being written. The first segment number corresponds to the top field and the second segment number corresponds to the bottom field. A segment number "X", as shown in states 606 and 614, indicates reconstruction of the TU section of a frame for pull-down while the data for the BU section is discarded. A "D" in a state denotes display, which is followed by two segment numbers indicating the segments being consecutively displayed during that state. A decision branch labeled PD indicates pull-down is performed for the present frame, whereas PD* indicates pull-down is not performed for that frame.

Operation begins in state 602, where the top field of a first frame is reconstructed and the data is written into segments #0,1. Operation proceeds to state 604, where the top field is displayed and the bottom field is reconstructed. The data from reconstruction is written into segments #2, 0 while segments #0 and #2 are displayed. Since pull-down of the first frame is required, operation proceeds to state 606, where the upper half of the top field of the first frame is again reconstructed while the bottom field is displayed. Operation proceeds to state 608, where pull-down of the top field occurs, and reconstruction of the next frame begins. Operation proceeds back to state 604 from state 608, where the top field of the second frame is displayed and the bottom field of the second frame is reconstructed. Since pull-down is not required for the second frame, operation proceeds to state 610 from state 604, where the bottom field of the second frame is displayed, and the top field of the third frame is reconstructed. Operation proceeds to state 612, where, where the top field of the third frame is displayed and the bottom field of the third frame is reconstructed. Since pull-down is required for the third frame, operation proceeds to state 614 from state 612, where the bottom field of the third frame is displayed while the top field is reconstructed again. Operation proceeds to state 610, where pull-down of the top field of the third frame is performed, while the top field of the fourth frame is reconstructed. Operation proceeds to state 612, where the top field of the fourth frame is displayed and the bottom field of the fourth frame is reconstructed. Since pull-down is not required for the fourth frame, operation returns to state 608 from state 612. Operation continues in a similar manner until all consecutive B frames have been reconstructed and displayed.

Figure 7A:
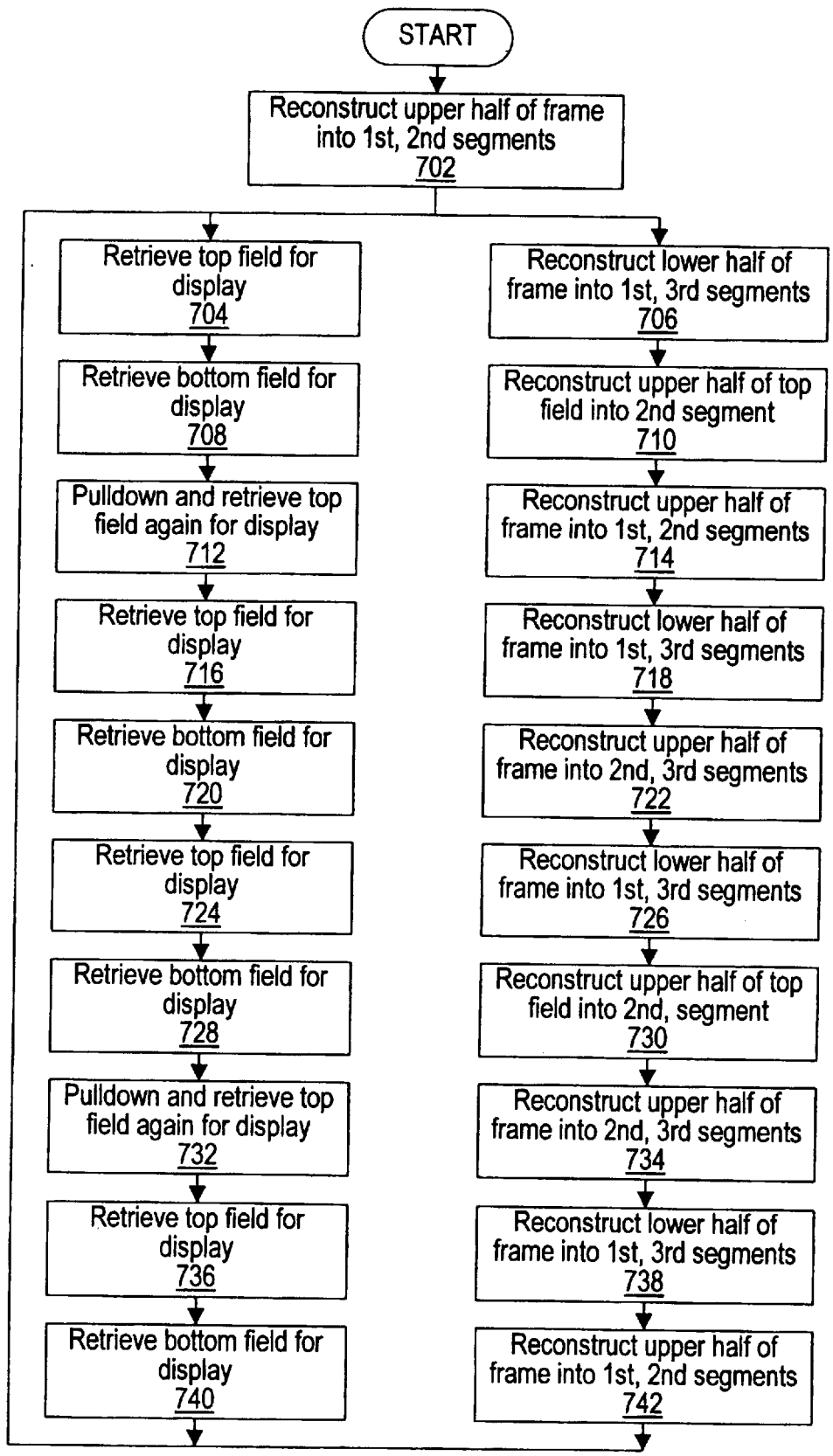
FIG. 7A is a flowchart diagram illustrating a method according to the present invention.

FIG. 7A is a flowchart diagram illustrating a method according to the present invention, which generally corresponds to the graph of FIG. 4, the tabular diagram 500 of FIG. 5 and the state diagram 600 of FIG. 6. In a first step 702, the upper half of the first frame is reconstructed into first and second segments. Operation then proceeds along two parallel paths for display and reconstruction operations, respectively. Each step of the display path corresponds to, and occurs at approximately the same time as, a corresponding step of the reconstruction path. Thus, steps 704 and 706 are performed together, as well as steps 708 and 710, 712 and 714, etc. The display path includes steps 704, 708, 712, 716, 720, 724, 728, 732, 736 and 740, which are performed sequentially. Likewise, the reconstruction path includes steps 706, 710, 714, 718, 722, 726, 730, 734, 738 and 742, which are also performed sequentially. From steps 740 and 742, operation proceeds back to steps 704 and 706, respectively.

For the display path, the top and bottom fields are displayed consecutively, as indicated in steps 704 and 708, 716 and 720, 724 and 728, and 736 and 740. The top field of every other frame is repeated for pull-down, as indicated in steps 712 and 732. For the reconstruction path, the upper half of the frame is reconstructed first, followed by the lower half, as indicated in steps 702 and 706, 714 and 718, 722 and 726, 734 and 738, and 742 and 706, etc. However, if pull-down is required for a frame, the upper half of the top field is reconstructed again as indicated in steps 710 and 730. It is noted that several steps are repeated but using different segments. For example, reconstruction of the upper half of the frame occurs in steps 714 and 734, but step 714 uses the first and second segments whereas step 734 uses the second and third segments.

Figure 7B:
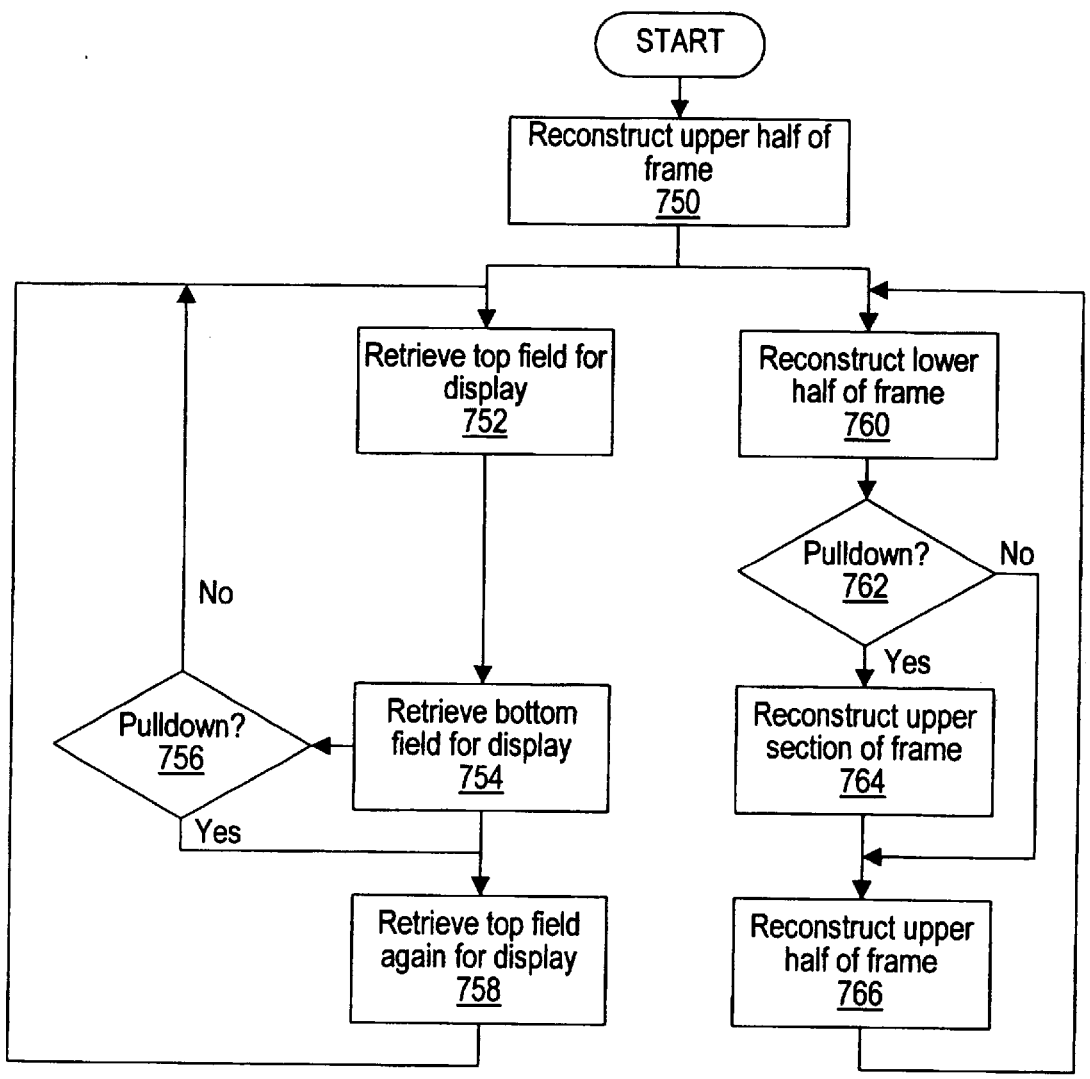
FIG. 7B is another flowchart diagram illustrating a method according to the present invention.

FIG. 7B is another flowchart diagram illustrating a method according to the present invention, which is similar to the flowchart of FIG. 7B except generalized. A first step 750 is similar to step 702, where the upper half of the first frame is reconstructed using any two segments. Operation then splits along parallel paths for display and reconstruction, respectively. For display, operation proceeds to step 752 where the top field of the frame is displayed. Then the bottom field of the frame is displayed in step 754. If the top field must be pulled-down and re-displayed for the current frame as determined in step 756, operation proceeds to step 758 to display the top field again. Operation then returns back to step 752 to display the top field of the next frame. If the top field of the current frame does not need to be re-displayed as determined in step 756, operation proceeds directly back to step 752 for the next frame. Operation continues until one or more consecutive B frames have been displayed.

For reconstruction, operation proceeds from step 750 to step 760, where the lower half of the current frame is reconstructed. Step 760 is performed simultaneously with display step 752. In the first iteration of step 760, one segment used is the first segment being displayed in step 752, and the other segment is the remaining segment not used in step 750. Thereafter, the first segment being displayed in step 752 is used as one segment in step 760. The other segment used is the whichever segment of the remaining two that contains data that has already been displayed and that will not be re-displayed for pull-down. Operation proceeds to step 762, where it is determined whether the current frame requires pull-down. If so, operation proceeds to step 764 where the top-upper section of the current frame is reconstructed again. Step 764, if performed, occurs at the same time as step 754, and the segment used in step 764 is the first segment being used in step 754. From step 764, operation proceeds to step 766 where the upper half of the next frame is reconstructed. If the current frame does not require pull-down as determined in step 762, operation proceeds directly to step 766. Step 766 is performed during each iteration and is performed at the same time as step 754, if pull-down is not performed for the current frame, and is otherwise performed at the same time as step 758 if pull-down is performed. Step 766 uses the first segment being displayed in either step 754 or 758, and uses whichever segment of the remaining two that contains data that has already been displayed and that will not be re-displayed for pull-down. From step 766, operation proceeds back to step 760 until one or more consecutive B frames have been reconstructed.

Figure 8:
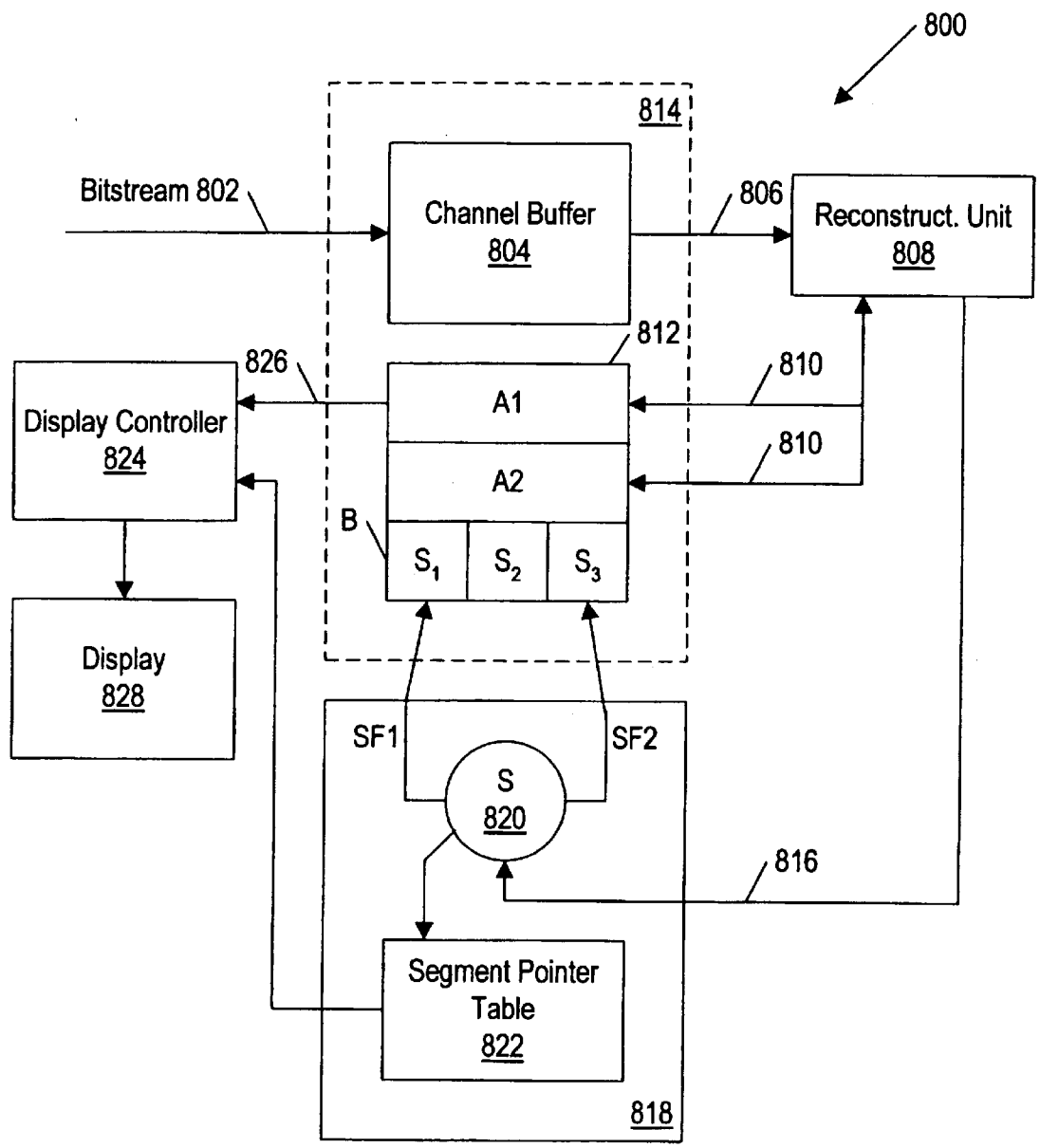
FIG. 8 is a simplified block diagram illustrating a decoder system implemented according to the present invention.

Referring now to FIG. 8, a simplified block diagram is shown of a decoder system 800 according to the present invention. The decoder system 800 shown in FIG. 8 primarily illustrates data flow and organization. Encoded video data in the form of a bitstream is provided to a rate or channel buffer 804 on a data channel 802 for temporary storage. The encoded video data typically includes picture information that is representative of a plurality of single frames of motion video. Each encoded frame or picture of motion video is represented in digital form as a sequence of bits. The structure of this sequence preferably conforms to a selected video compression standard, such as the MPEG-1 or MPEG-2 standards, for example. The video data within the channel buffer 804 is provided on another channel 806 to a reconstruction unit 808, which decodes the picture data to a form appropriate for display.

The reconstruction unit 808 preferably incorporates decoder functions for translating the encoded video data into corresponding symbols and/or events, where these symbols or events are then reconstructed into the original frames. For example, the reconstruction unit 808 may include an IDCT pipeline, a motion compensation (MC) pipeline and a merge and store unit for executing the reconstruction process. The IDCT pipeline coordinates the reconstruction of each macroblock of a frame, and the MC pipeline processes any motion compensation information with respect to each macroblock.

The reconstructed frame data from the reconstruction unit 808 is then provided to a picture buffer 812 across a data channel 810. The picture buffer 812 preferably includes enough memory for two full anchor frames, referred to as A1 and A2, where the anchor frames are either I or P frames according to the MPEG standard. The data channel 810 is bidirectional and enables the reconstruction unit 808 to retrieve data from either anchor frame A1 or A2 in the picture buffer 812. For example, the anchor frame A1 may store an I frame previously reconstructed by the reconstruction unit 808. The reconstruction unit 808 may retrieve the I frame and merge data from the channel buffer 804 for reconstruction of a P frame. The P frame may then be stored in the picture buffer 812 as the anchor frame A2.

The picture buffer 812 also includes memory for storage of data for a B frame. As in prior art systems, the anchor frames A1 and A2 are retrieved by the reconstruction unit 808, for reconstructing a B frame, so that the anchor frames A1 and A2 must be fully available in decoded form. However, in prior art systems, the memory size required in the picture buffer for the B frame was the same size as the anchor frames A1 and A2. Thus, a picture buffer previously had to include enough memory for three fall framestores, including the two anchor frames A1 and A2 and a full B frame. In the picture buffer 812, however, the B frame is preferably segmented into three segments S1, S2, and S3, where the total memory required to store and display the B frame is less than a full framestore worth of memory. Preferably, each segment S1–S3 is one-fourth of a framestore for a total memory size for B frames of 0.75 framestores. The bit size of each of the segments S1–S3 depends upon the total size of the framestore. For NTSC frames having a total of 4,147,200 bits, the size of the memory M need only be 3,110,400 bits. When any one of the segments S1–S3 of the B frame is being displayed, that segment is freed up for reconstructed data. This is achieved without affecting the page hit rate of the DRAMs typically used to implement the picture buffer 812, and without affecting the display of the B frame. Such reduction of the amount of memory required for storing the B frame results in cost savings of the overall decoder system 800. In the preferred embodiment, the channel buffer 804, the picture buffer 812 as well as any other memory required for functions performed are incorporated into a single memory device 814 having a maximum size of 16 Mb. This results in significant cost reduction of the memory device 814.

According to the present invention, the reconstruction unit 808 provides B frame data on a data channel 816 to a segmentor 820 of a segmentation unit 818, where the segmentor 820 divides the data into top and bottom fields SF1 and SF2. The top and bottom field data is then written to the B frame portion of the picture buffer 812. In particular, top field data SF1 is provided into a first segment, such as segment S1, while bottom field data SF2 is provided to a second segment, such as segment S2. When these segments S1 and S2 are full, the segmentor 820 chooses another two segments and provides the separated data to two more segments. Preferably, the segmentor 820 maintains a segment pointer table 822 for keeping track of the order of the segments S1–S3.

The segment pointer table 822 need only include four pointer locations for storing pointers to the segments. During reconstruction of the first half of the first frame, the segmentor 820 stores the pointer to the segment containing the upper half of the top field in the first location and stores the pointer to the segment containing the upper half of the bottom field in the third location. During reconstruction of the second half of the first frame, the segmentor 820 stores the pointer to the segment containing the lower half of the top field in the second location and stores the pointer to the segment containing the lower half of the bottom field in the fourth location. For purposes of pull-down, the segmentor 820 need only place the pointer to the upper half of the top field into the first location. For the second frame, the order of the entries is switched. Thus, during reconstruction of the first half of the second frame, the segmentor 820 stores the pointer to the segment containing the upper half of the top field in the third location and stores the pointer to the segment containing the upper half of the bottom field in the first location. During reconstruction of the second half of the second frame, the segmentor 820 stores the pointer to the segment containing the lower half of the top field in the fourth location and stores the pointer to the segment containing the lower half of the bottom field in the second location. The order remains reversed until the next pull-down, where the order is once again reversed. A display controller 824 retrieves the pointers in sequential order of the pointer locations for interlaced display, which means the $1^{st}$, $2^{nd}$, $3^{rd}$, $4^{th}$, and then back to the $1^{st}$ st pointer, etc. Of course, the segmentor 820 may place the pointers in sequential order while the display controller 824 retrieves the pointers in the appropriate order for interlaced display.

The display controller 824 retrieves data of a frame stored in the picture buffer 812 across a data channel 826 and provides the data in the appropriate form for display on a display device 828. The display device 828 is preferably a monitor, a TV, or any comparable display device. The display controller 824 and display device 830 displays the information in interlaced format. This is performed in a standard manner for the anchor frames A1 and A2. For B frames, however, the display controller 824 retrieves data from each of the segments S1–S3 one at a time. The display controller 824 preferably accesses the segment pointer table 822 within the segmentation unit 818 to determine which of the segments S1–S3 to display at any given time. The pointers to the segments S1–S3 are not necessarily listed in numerical order in the segment pointer table 822. However, the segment pointers are preferably retrieved from the table 822 in sequential order. Also, each of the segments are used and accessed more than once.

Figure 9:
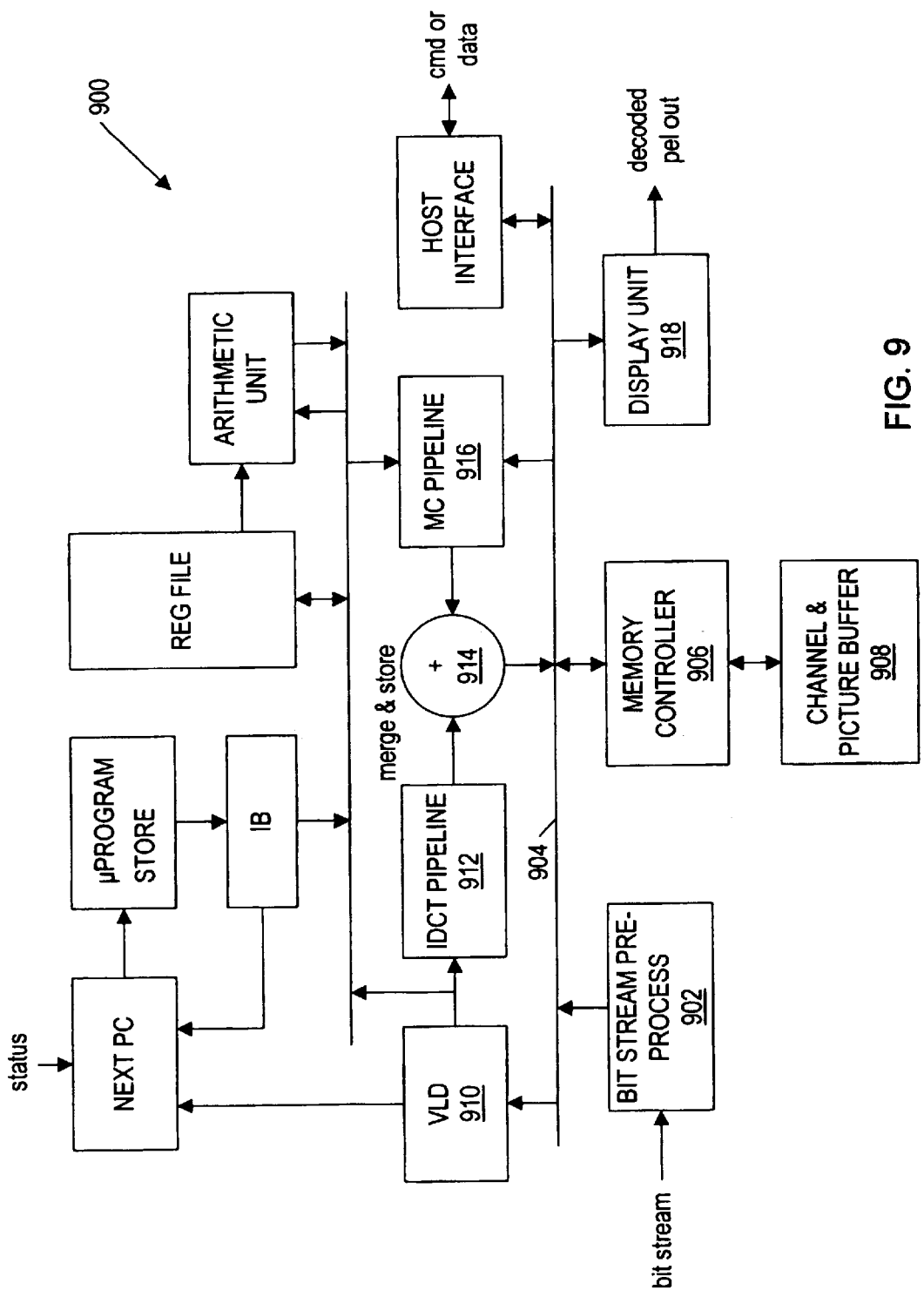
FIG. 9 is a block diagram of another decoder system implemented according to the present invention.

Referring now to FIG. 9, a block diagram is shown of another decoder system 900 according to the present invention. The decoder system 900 is preferably an NTSC type MPEG-2 decoder. It is noted, however, that the present invention is not limited to MPEG and may be used for any particular video standard or configuration requiring 3:2 pull-down capability. A bitstream of video data is received by a bitstream pre-processor 902 coupled to a common memory bus 904, where the pre-processor 902 extracts the encoded video data and provides the data on the bus 904. A memory controller 906 retrieves the data from the bus 904 for temporary storage in a channel buffer portion of a memory device 908. The memory controller 906 is coupled between the bus 904 and the memory device 908 for controlling access to the memory device 908. The memory device 908 is preferably implemented with DRAMs, and preferably includes the channel buffer and a picture buffer for storing pixel data for I, P and B frames.

Video data from the channel buffer is then provided across the bus 904 to a variable length decoder (VLD) 910, which converts the data to DCT data. The data is then provided to an IDCT pipeline 912, which converts the DCT data to macroblocks of pixel data. The macroblocks are provided to a merge and store unit 914 coupled to the bus 904, which provides the data back to the memory device 908. This procedure is followed for I frames. The procedure is similar for P frames, except that the data from the IDCT pipeline 912 is merged with I frame data from a motion compensation (MC) pipeline 916, which retrieves I frame data from the picture buffer in the memory device 908. The procedure is similar for B frames, except that data from both I and/or P anchor frames may be merged together to reconstruct a B frame.

The VLD 910, the IDCT pipeline 912, the MC pipeline 916 and the merger and store unit 914 collectively perform reconstruction of frame data. I and P frames are generally stored within the memory device 908 in a standard manner. However, B frames are segmented into the memory device 908 in accordance with the present invention as described previously. In this manner, the memory device 908 need only include enough memory for less than 3 full framestores, and preferably 2.75 framestores. The segmentation process may be performed by the merge and store unit 914 and the display unit 918 or by the memory controller 906, or by any particular combination of these devices. The memory controller 906 is a convenient centralized location for storing B frame data into segments and for providing the data in appropriate order to the display unit 918. In the preferred embodiment, however, B frame segmentation according to the present invention is performed by a combination of the merge and store unit 914 and the display unit 918. Thus, the merge and store unit 914 contains circuitry for storing B frame data in the picture buffer of the memory device 908 in segments, and the display unit 918 includes circuitry for retrieving the segments in appropriate order for display.

It is now appreciated that a method and apparatus for reducing the memory required for decoding bidirectionally predictive-coded frames during pull-down according to the present invention substantially reduces the amount of memory required for a video decoder. Since the amount of memory is a major cost item in the production of such decoders, substantial cost savings are achieved. In general, B frames are not used to predict other frames, so that once the B frame data is displayed, it may be discarded. To enable re-use of memory, data from the top and bottom fields is separated into different segments of memory. Thus, once display begins of the data in a segment, that segment becomes free for reconstruction. However, this initial scheme is not completely sufficient for the top field of every other frame during 3:2 pull-down, since the top field must be somehow made available again for re-display. Rather than requiring additional memory to save the top field of every other frame, the top field is reconstructed again during the period when reconstruction is typically stalled. In this manner, the amount of memory required is reduced, and the field requiring re-display for 3:2 pull-down is simply reconstructed again.

More particularly, a frame is conceptually divided into four sections, including the upper and lower halves of the top field and the upper and lower halves of the bottom field. The memory for storing and displaying the B frame includes three segments, each being the same size as each of the four sections of the frame. The upper half of a first frame, including the top-upper and bottom-upper sections, is reconstructed into two segments of memory. The segment containing the top-upper section is then displayed while that same segment and a third segment are used to reconstruct the lower half of the first frame, including the top-lower and bottom-lower sections. The top-lower section is also displayed during the reconstruction of the lower half of the first frame. Then, the segment storing the bottom-upper section is displayed while that same section is also used to reconstruct the top-upper section if the top field must be re-displayed. The reconstruction of the top-upper section completes while the bottom field is being displayed. In this manner, two segments of memory store the entire top field after the first frame has been completely displayed. The top field is displayed again from these two segments to achieve pull-down. Operation is similar for the next frame, except that pull-down is not necessary since only performed for every other frame.

Since there are only three segments of memory, it is a relatively straightforward procedure for a decoding or reconstruction unit or segmentor to determine the next two available segments, and for a display unit to determine the appropriate order of segments to display. A segment pointer table may be used for this purpose, which is a list of pointers to the segments. The table is updated during reconstruction to list the segments in display order. Thus, display devices need only read the pointers from the segment table in consecutive order to identify the next segment for display. Also, since only three segments are required to store and display B frames including 3:2 pull-down, where each segment is one-fourth the size of the frame, the framestore for B frames is only 0.75 times a full framestore. Thus, the size of the picture buffer is reduced to 2.75 framestores for anchor and B frames.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A decoder system for efficient decoding and retrieving bidirectionally predictive-coded (B) frames of pixel data for display including pull-down, wherein each B frame includes four sections corresponding to upper and lower portions of first and second fields of the frame, respectively, the decoder system comprising:

a reconstruction unit for reconstructing B frames into pixel data, wherein said reconstruction unit reconstructs the upper portion of the first field of every other frame twice;

a memory including three segments for storing pixel data, wherein each segment is sized to store any one of the frame sections;

a segmentor coupled to said reconstruction unit and said memory for receiving and separating said B frame pixel data according to the first and second fields for each section of each frame, wherein said segmentor stores pixel data from the first field into one segment and stores pixel data from the second field into another segment of the memory, and wherein said segmentor initially selects any two of said three segments, and then selects a segment being retrieved for display and the remaining segment, and thereafter selects the segment being retrieved for display and whichever segment contains pixel data that has already been retrieved for display and that will not be re-displayed, and further selects the segment being retrieved for display for receiving pixel data for pull-down; and retrieval circuitry coupled to said memory for retrieving pixel data from one of said three segments at a time for interlaced display including pull-down.

2. The decoder system of claim 1, wherein 3:2 pull-down is performed.

3. The decoder system of claim 2, wherein the decoder operates according to the National Television Systems Committee (NTSC) format.

4. The decoder system of claim 3, wherein each B frame comprises a plurality of macroblock rows, and wherein each of said plurality of macroblock rows includes data for two of the four sections of each frame.

5. The decoder system of claim 3, wherein each frame includes 720 pixels by 480 lines.

6. The decoder system of claim 5, wherein each frame includes twelve bits per pixel on the average, so that each of said three segments of said memory includes no more than 1,036,800 bits.

7. The decoder system of claim 6 wherein said memory further includes two full framestores for storing two anchor frames.

8. The decoder system of claim 1, wherein said memory is implemented using dynamic random access memory.

9. The decoder system of claim 1, wherein said retrieval circuitry begins retrieving pixel data from said plurality of segments of said memory after said memory stores one-half of a decoded B frame.

10. The decoder system of claim 1, further comprising:

a segment pointer table comprising a list of pointers to said segments; and wherein said segmentor maintains said segment pointer table by placing said pointers in an appropriate order for interlaced display of said B frame pixel data.

11. The decoder system of claim 10, wherein said retrieval circuitry retrieves each of said pointers from said segment pointer table in sequential order for accessing each of said segments.

12. A method of reconstructing, storing and retrieving pixel data for display of bidirectionally predictive-coded (B) frames using pull-down conversion using three segments of memory, wherein each segment is one-fourth the size of a framestore, the method comprising the steps of:

reconstructing the upper half of each frame into pixel data;

reconstructing the lower half of each frame into pixel data;

for every other frame, reconstructing the upper half of the frame into pixel data again;

during each of said reconstruction steps, separating the pixel data according to first and second fields of the frame;

selecting two available segments for said step of reconstructing the upper half of the frame, selecting another two available segments for said step of reconstructing the lower half of the frame and further selecting one available segment for said step of reconstructing the upper half again;

storing first field pixel data into one selected segment and storing second field data into the other selected segment during said steps of reconstructing the upper half of the frame and reconstructing the lower half of the frame, and further storing first field pixel data into the selected segment for said step of reconstructing the upper half of the frame again; and retrieving for interlaced display the stored pixel data from the segments of memory.

13. The method of claim 12, wherein said step of selecting segments comprises the steps of:

selecting any two segments for the upper half of a first frame;

selecting a segment being retrieved and the third segment for the lower half of a first frame;

during either of said steps of reconstructing the upper half of the frame and reconstructing the lower half of the frame, selecting the segment being retrieved and whichever segment contains pixel data that has already been retrieved and that will not be retrieved for re-display; and during said step of reconstructing the upper half of the frame into pixel data again, selecting the segment being retrieved for receiving first field pixel data.

14. The method of claim 12, further comprising the steps of:

updating a segment table including a list of pointers to segments according to interlaced display; and said retrieving step further comprising the step of retrieving pointers from the segment table.

* * * * *